US008630052B1

(12) United States Patent
Jung et al.

(10) Patent No.: US 8,630,052 B1
(45) Date of Patent: Jan. 14, 2014

(54) DISK DRIVE CALIBRATING RADIAL DENSITY THEN ADJUSTING LINEAR DENSITY TO BALANCE OFF-TRACK READ CAPABILITY

(75) Inventors: Kameron Kam-Wai Jung, Yorba Linda, CA (US); Paul C. Santa Ana, Las Vegas, NV (US); Johanes S. Ma, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 247 days.

(21) Appl. No.: 13/196,297

(22) Filed: Aug. 2, 2011

Related U.S. Application Data (60) Provisional application No. 61/381,216, filed on Sep. 9, 2010.

(51) Int. Cl.
*G11B 5/02* (2006.01)

(52) U.S. Cl.
USPC ............... 360/55; 360/75; 360/77.06; 360/69

(58) Field of Classification Search
None
See application file for complete search history.

(56) References Cited

U.S. PATENT DOCUMENTS

| | | | |
|---|---|---|---|
| 4,945,427 A | 7/1990 | Cunningham | |
| 5,596,458 A | 1/1997 | Emo et al. | |
| 5,739,994 A | 4/1998 | Ottesen et al. | |
| 5,812,755 A | 9/1998 | Kool et al. | |
| 5,870,237 A | 2/1999 | Emo et al. | |
| 5,930,069 A | 7/1999 | Kim | |
| 5,940,237 A | 8/1999 | Takagi | |
| 5,949,603 A | 9/1999 | Brown et al. | |
| 5,956,196 A | 9/1999 | Hull et al. | |
| 6,005,725 A | 12/1999 | Emo et al. | |
| 6,052,250 A | 4/2000 | Golowka et al. | |
| 6,084,738 A | 7/2000 | Duffy | |
| 6,091,559 A | 7/2000 | Emo et al. | |
| 6,105,104 A | 8/2000 | Guttmann et al. | |
| 6,118,604 A | 9/2000 | Duffy | |
| 6,130,796 A | 10/2000 | Wiselogel | |
| 6,137,644 A | 10/2000 | Hetzler et al. | |
| 6,172,839 B1 | 1/2001 | Ahn | |
| 6,182,250 B1 | 1/2001 | Ng et al. | |
| 6,195,218 B1 | 2/2001 | Guttmann et al. | |
| 6,256,160 B1 | 7/2001 | Liikanen et al. | |
| 6,262,857 B1 | 7/2001 | Hull et al. | |
| 6,317,285 B1 | 11/2001 | Bi et al. | |
| 6,396,654 B2 | 5/2002 | Jeong et al. | |
| 6,441,981 B1 | 8/2002 | Cloke et al. | |
| 6,466,387 B1 | 10/2002 | Ogasawara et al. | |
| 6,493,176 B1 | 12/2002 | Deng et al. | |
| 6,560,052 B2 | 5/2003 | Ng et al. | |
| 6,751,036 B2 | 6/2004 | Quak et al. | |
| 6,765,737 B1 | 7/2004 | Lim et al. | |
| 6,765,744 B2 | 7/2004 | Gomez et al. | |
| 6,778,343 B2 | 8/2004 | Nunnelley | |
| 6,943,972 B1 | 9/2005 | Chue et al. | |
| 6,950,256 B2 | 9/2005 | Kadokawa | |
| 6,956,710 B2 | 10/2005 | Yun et al. | |
| 6,969,989 B1 | 11/2005 | Mei | |

(Continued)

*Primary Examiner* — Muhammad N Edun (57) ABSTRACT

A disk drive is disclosed comprising a plurality of disk surfaces, and a head actuated over each disk surface. An off-track read capability (OTRC) is measured for each disk surface, and a radial density of data tracks for each disk surface is selected in response to the OTRCs. A linear density of at least two disk surfaces is adjusted to balance the OTRCs across the disk surfaces.

14 Claims, 7 Drawing Sheets

(56) References Cited

U.S. PATENT DOCUMENTS

| | | |
|---|---|---|
| 7,012,771 B1 | 3/2006 | Asgari et al. |
| 7,012,773 B2 | 3/2006 | Ashikaga et al. |
| 7,046,471 B2 | 5/2006 | Meyer et al. |
| 7,110,197 B2 | 9/2006 | Cho |
| 7,113,358 B2 | 9/2006 | Zayas et al. |
| 7,145,740 B2 | 12/2006 | Zayas et al. |
| 7,170,700 B1 | 1/2007 | Lin et al. |
| 7,215,514 B1 | 5/2007 | Yang et al. |
| 7,283,316 B2 | 10/2007 | Chiao et al. |
| 7,362,529 B2 | 4/2008 | Chiao et al. |
| 7,433,143 B1 | 10/2008 | Ying et al. |
| 7,436,610 B1 | 10/2008 | Thelin |
| 7,688,540 B1 | 3/2010 | Mei et al. |
| 2002/0039246 A1 | 4/2002 | Ding et al. |
| 2004/0136104 A1 | 7/2004 | Chiao et al. |
| 2004/0179292 A1 | 9/2004 | Zayas et al. |
| 2006/0018051 A9 | 1/2006 | Chiao et al. |
| 2006/0082918 A1* | 4/2006 | Kosugi et al. .................. 360/75 |
| 2006/0227445 A1 | 10/2006 | Chiao et al. |
| 2007/0064325 A1 | 3/2007 | Bi et al. |
| 2007/0127150 A1 | 6/2007 | Cho et al. |

\* cited by examiner

DISK DRIVE CALIBRATING RADIAL DENSITY THEN ADJUSTING LINEAR DENSITY TO BALANCE OFF-TRACK READ CAPABILITY

CROSS-REFERENCE TO RELATED APPLICATIONS

The present application claims priority from provisional U.S. Patent Application Ser. No. 61/381,216, filed on Sep. 9, 2010, the specification of which is incorporated herein by reference.

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric data tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
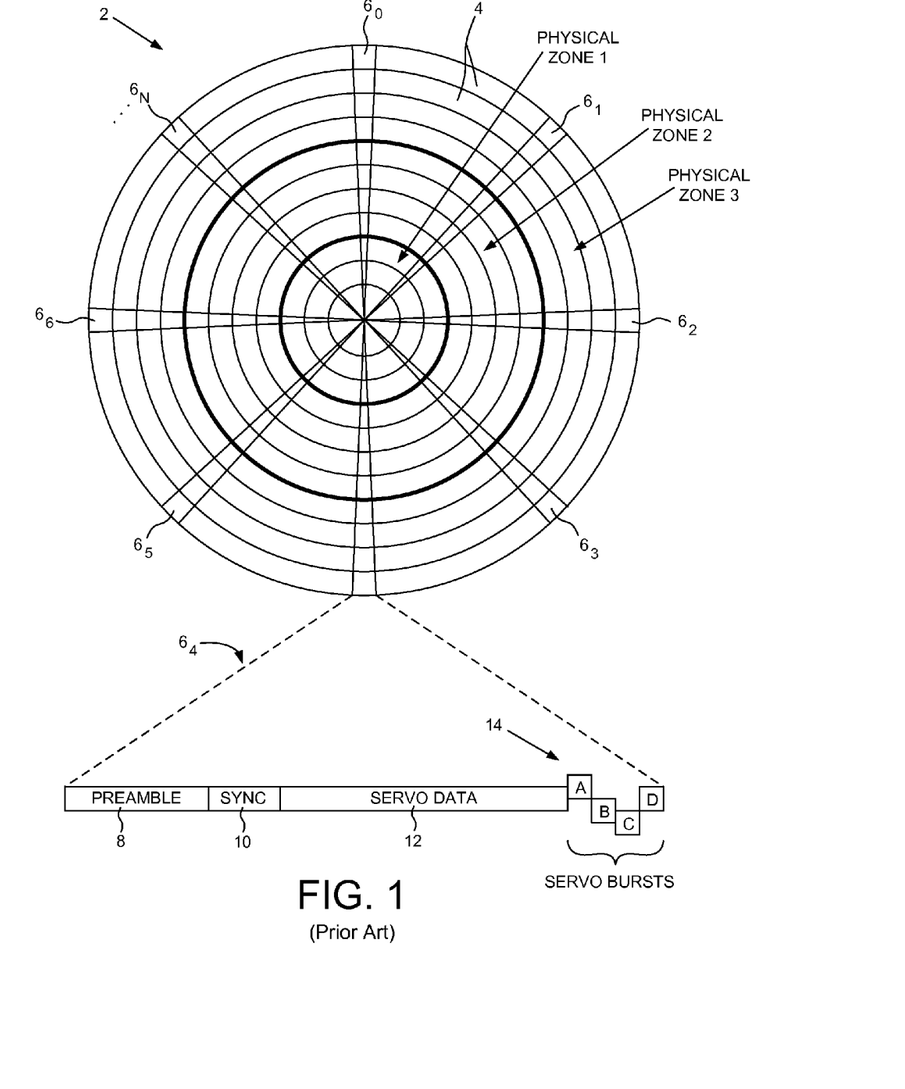
FIG. 1 shows a prior art disk format comprising a plurality of tracks defined by embedded servo sectors.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figures 2A, 2B:
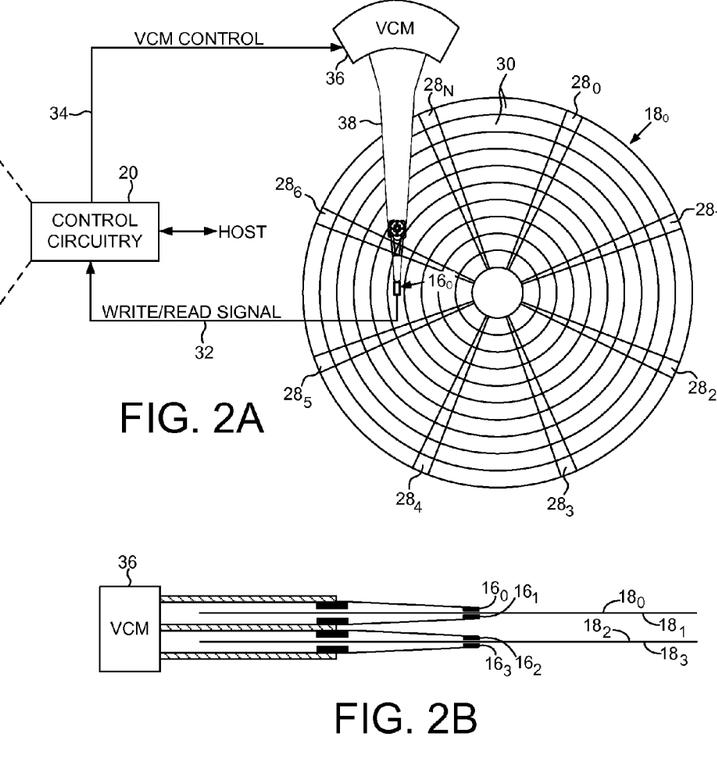
FIGS. 2A and 2B show a disk drive according to an embodiment of the present invention comprising a plurality of disk surfaces and a head actuated over each disk surface.
Figure 2C:
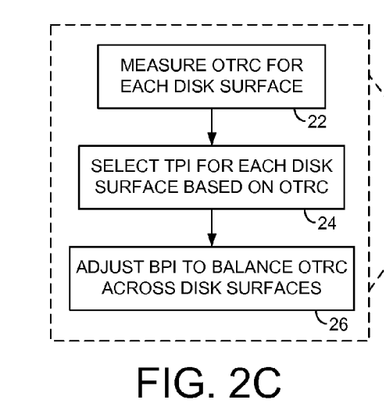
FIG. 2C is a flow diagram according to an embodiment of the present invention wherein a radial density of data tracks is selected by measuring an off-track read capability (OTRC), and then a linear density of at least two disk surfaces is adjusted to balance the OTRC across the disk surfaces.

FIGS. 2A and 2B show a disk drive comprising a plurality of disk surfaces $18_0$-$18_3$, and a head $16_0$-$16_3$ actuated over each disk surface. The disk drive further comprises control circuitry 20 operable to execute the flow diagram of FIG. 2C wherein an off-track read capability (OTRC) is measured for each disk surface (step 22), and a radial density of data tracks for each disk surface is selected in response to the OTRCs (step 24). A linear density of at least two disk surfaces is adjusted to balance the OTRCs across the disk surfaces (step 26).

Each disk surface (e.g., disk surface $18_0$) shown in the embodiment of FIG. 2A comprises a plurality of servo sectors $28_0$-$28_N$ that define concentric servo tracks 30. A plurality of data tracks are defined relative to the servo tracks, wherein a radial density of the data tracks (tracks per inch or TPI) is selected by defining any suitable ratio of servo tracks to data tracks. The control circuitry 20 processes a read signal 32 emanating from the head $16_0$ to demodulate the servo sectors $28_0$-$28_N$ into a position error signal (PES) representing a position error of the head relative to a target data track. The control circuitry 20 comprises a servo compensator for filtering the PES to generate a control signal 34 applied to a voice coil motor (VCM) 36 that rotates an actuator arm 38 about a pivot in order to actuate the head $16_0$ radially over the disk $18_0$ in a direction that reduces the PES.

Figure 2D:
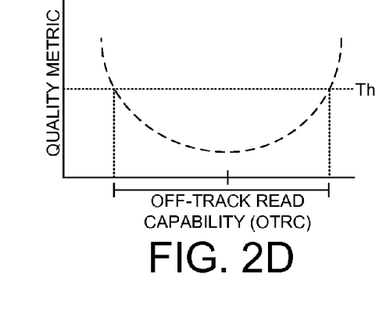
FIG. 2D shows an OTRC relative to a measured quality metric according to an embodiment of the present invention.

FIG. 2D illustrates an example embodiment for measuring an OTRC wherein for a selected radial density of data tracks the ability to read a data track is measured at each of a plurality of off-track offsets. A corresponding quality metric is generated for each off-track offset, such as a bit error rate. As the off-track offset increases, the bit error rate increases, wherein the OTRC is defined as the width of the off-track offset relative to a threshold level (Th) for the quality metric as illustrated in FIG. 2D. A bit error rate metric results in a "bathtub" curve for the quality metric with a minimum at zero off-track offset as shown in FIG. 2D; however, other quality metrics may exhibit an inverted bathtub curve having a maximum at zero off-track offset and an OTRC defined relative to when the quality metric falls below a threshold. Any suitable quality metric may be evaluated to measure the OTRC, such as the log-likelihood ratios of an iterative correction code or an iterative sequence detector, branch metrics of a Viterbi sequence detector, mean squared error between expected and actual read signal sample values, gain control and/or timing recovery errors, read signal amplitude, etc.

In one embodiment, a combined target capacity for all of the disk surfaces is defined for a production disk drive. The radial density and linear density for each disk surface is optimized relative to the combined target capacity while maintaining adequate performance. If adequate performance cannot be achieved at the combined target capacity, the combined target capacity is reduced and the radial and linear densities re-optimized relative to the reduced capacity. This process is repeated until a combined target capacity is reached that also provides adequate performance (e.g., an OTRC that exceeds a minimum threshold as described below).

Figure 3:
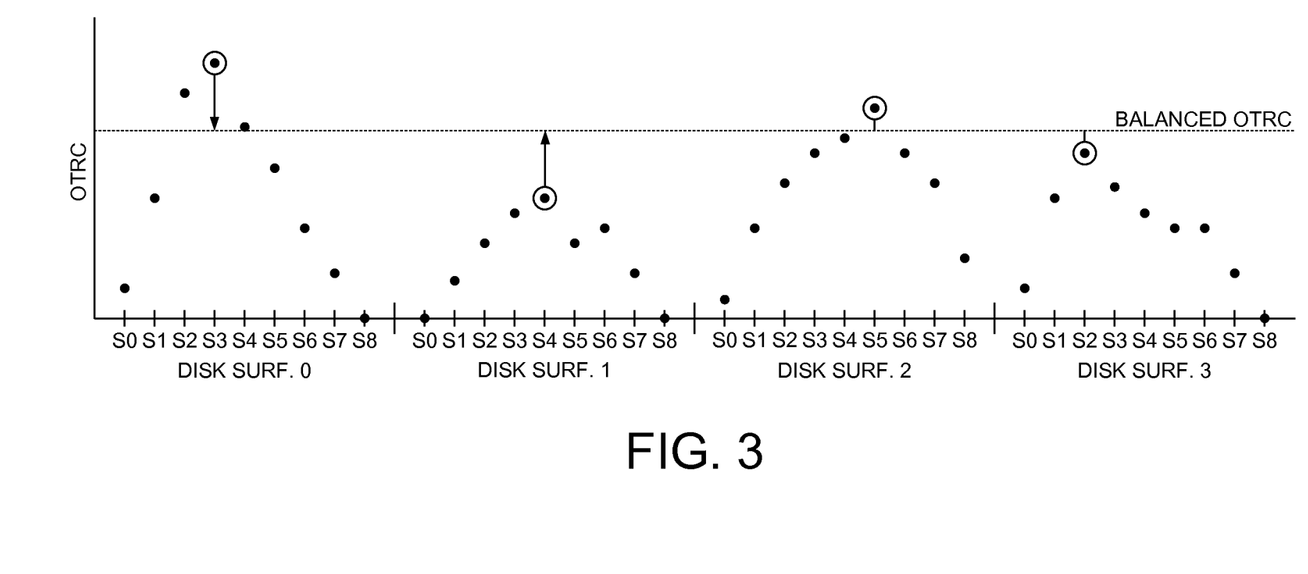
FIG. 3 illustrates an OTRC generated over different radial densities for each disk surface, and balancing the OTRCs by adjusting the linear density of at least two disk surfaces.

FIG. 3 illustrates an embodiment of the present invention for selecting a radial density of data tracks for each disk surface. The horizontal axis represents a number of radial density settings (TPI settings) for each disk surface (i.e., radial density settings S0 to S8). For each radial density setting, there is a corresponding linear density setting (bits per inch or BPI) that achieves a combined target capacity for the disk surfaces. At higher radial density settings, the linear density is decreased, and at lower radial density settings, the linear density is increased, thereby maintaining the combined target capacity. For each radial density setting (and corresponding linear density setting) an OTRC is measured (vertical axis of FIG. 3). In one embodiment, the radial density setting that maximizes the OTRC is selected for each disk surface as illustrated in FIG. 3. The linear density for at least two of the disk surfaces is then adjusted in order to balance the OTRCs across the disk surfaces. This is illustrated in FIG. 3 as decreasing the linear density for disk surfaces 0 and 2, and correspondingly increasing the linear density for disk surfaces 1 and 3 to balance the OTRCs while maintaining the combined target capacity for the disk surfaces. In one embodiment, if the resulting balanced OTRCs is below a minimum threshold, the combined target capacity for the disk surfaces is reduced and the process is repeated until the balanced OTRCs exceeds the threshold.

Figure 4A:
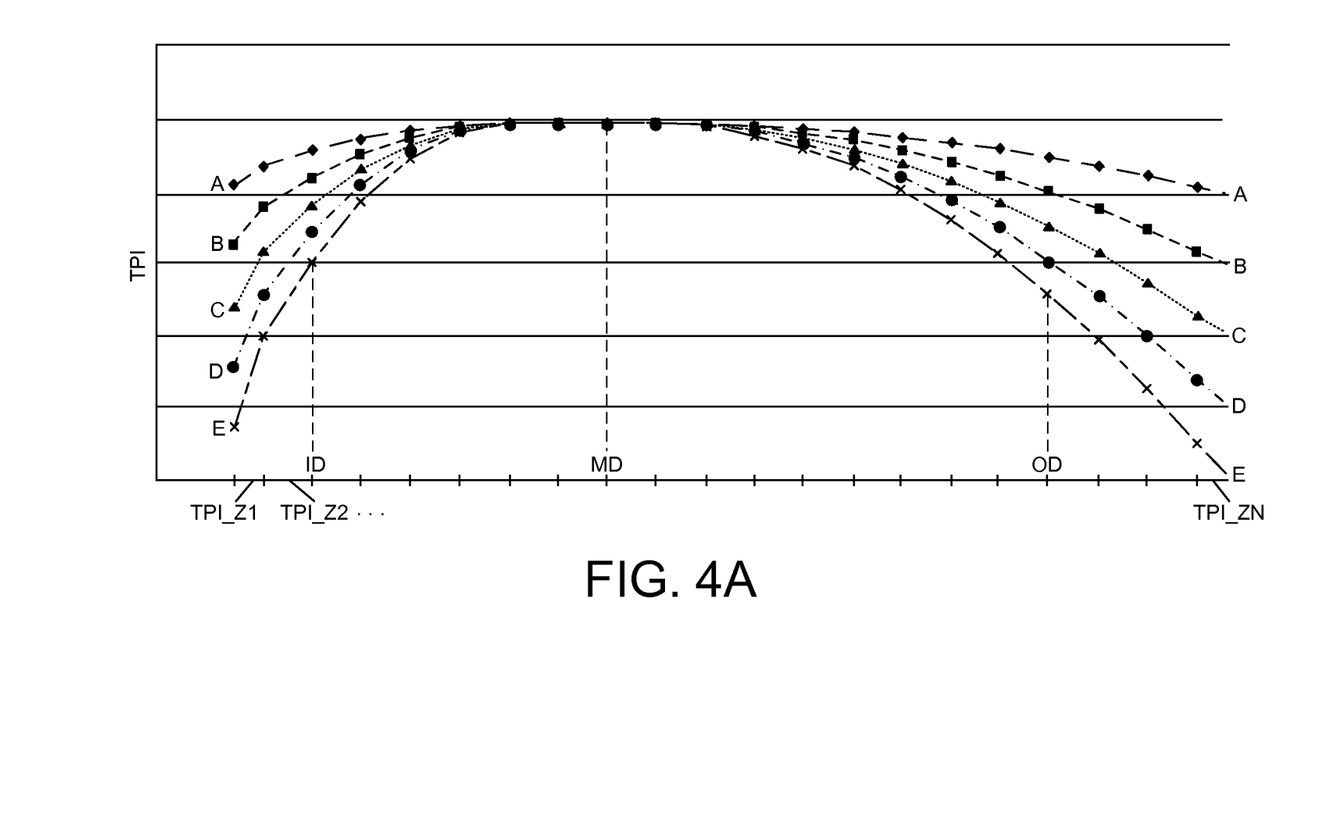
FIG. 4A shows an embodiment of the present invention wherein a radial density profile is selected for each disk surface based on the OTRCs.

FIG. 4A illustrates an embodiment of the present invention wherein one of a plurality of radial density profiles may be selected for each disk surface based on the measured OTRCs. In the example of FIG. 4A, each radial density profile comprises a decreasing TPI toward the inner diameter (ID) and the outer diameter (OD) of the disk surface. Decreasing the radial density toward the ID and OD may help compensate for a skew angle of the head as well as a specific geometry of each head. For example, depending on the geometry of each head, a particular radial density profile may be more optimal for each disk surface. In one embodiment, the linear density is adjusted for each radial density profile in order to maintain a target capacity across the radial density profiles.

In the embodiment of FIG. 4A, the disk surface is divided into a plurality of TPI zones, where each TPI zone defines a band of data tracks. The linear density of the data tracks varies between the TPI zones, for example, increases toward the outer diameter TPI zones similar to the physical zones in the prior art disk format of FIG. 1. In one embodiment, the TPI zone boundaries may be different across the disk surfaces.

Figure 4B:
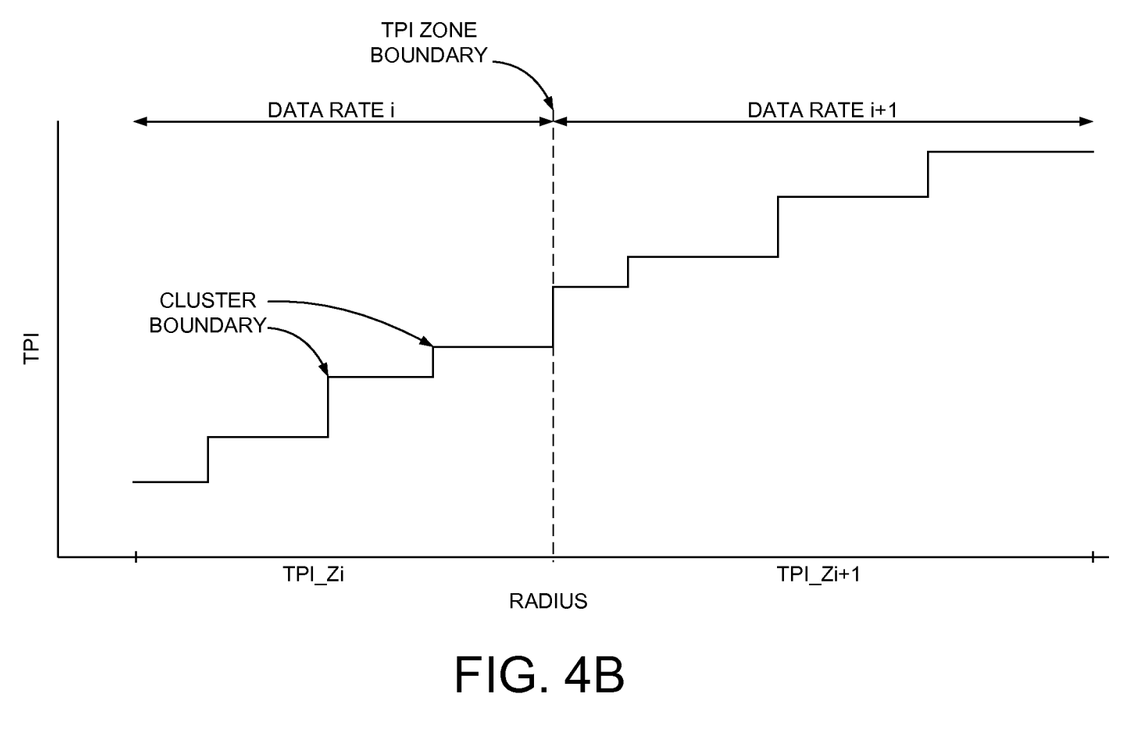
FIG. 4B shows an embodiment of the present invention wherein each radial density profile is generated by combining segments of a constant radial density across a disk surface.

FIG. 4B shows an embodiment wherein each TPI zone comprises a plurality of TPI segments, wherein each TPI segment comprises a constant radial density of data tracks over a radial segment of the disk (i.e., over a plurality of the data tracks). In one embodiment, each TPI segment comprises one or more clusters that define a serpentine pattern for accessing the data tracks across multiple disk surfaces. As illustrated in FIG. 4B, the boundaries of each TPI segment as well as the boundaries of each TPI zone align with a cluster boundary. Further details concerning clusters and the serpentine pattern they define are disclosed in U.S. Pat. No. 7,436,610 entitled "DISK DRIVE EMPLOYING DIFFERENT ZONE BOUNDARIES ACROSS DISK SURFACES" the disclosure of which is incorporated herein by reference.

Figure 5:
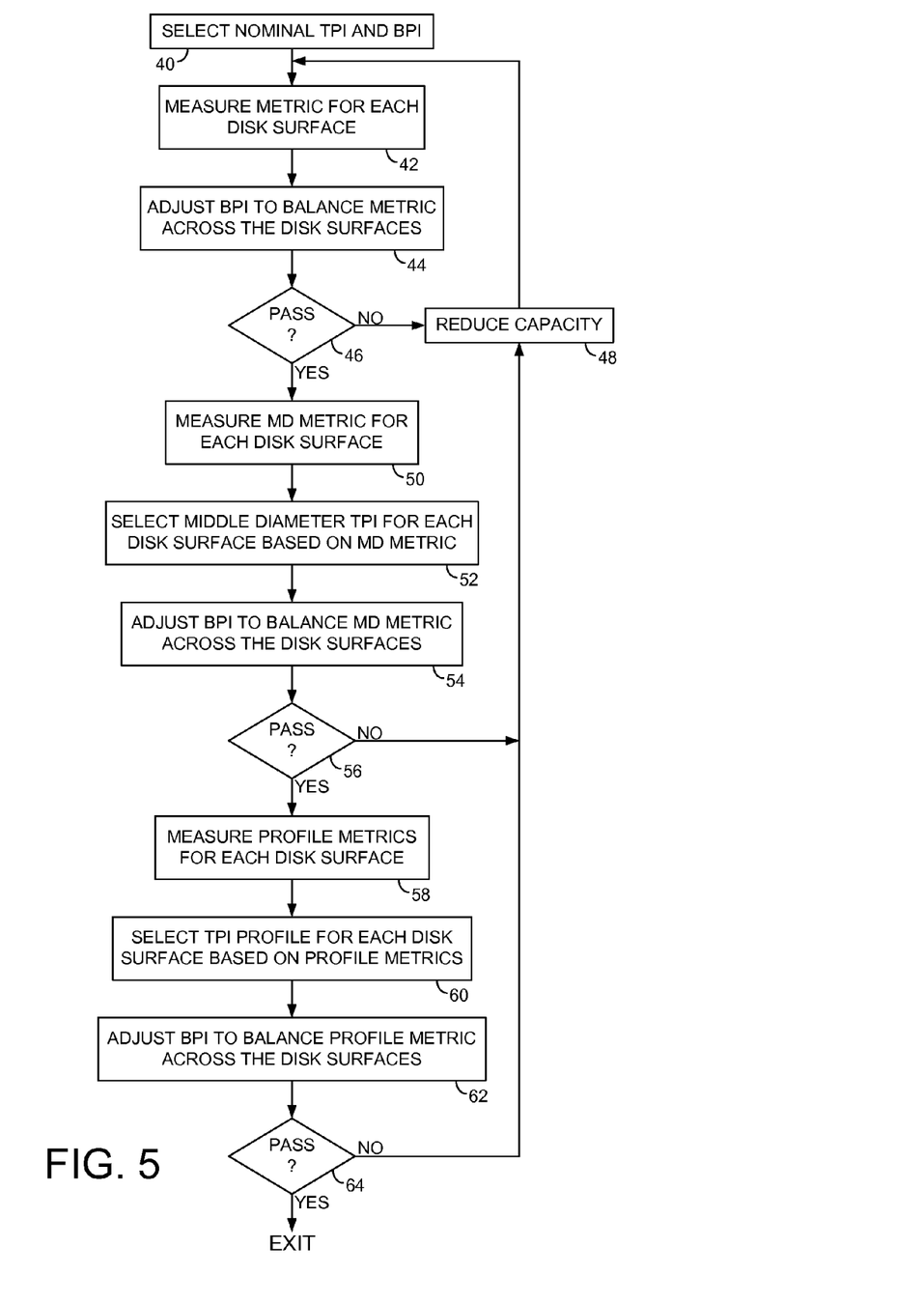
FIG. 5 is a flow diagram according to an embodiment of the present invention wherein a radial density is selected for a middle diameter of each disk surface, and then a radial density profile is selected for each disk surface based on OTRCs.

FIG. 5 shows a flow diagram according to an embodiment of the present invention for selecting a radial density profile for each disk surface based on the measured OTRCs, and then adjusting the linear density to balance the OTRCs. Prior to optimizing the radial density, a nominal radial and linear density is selected for each disk surface that achieves a combined target capacity (step 40). A metric is then measured for each disk surface (step 42), such as measuring a bit error rate of a data track near the middle diameter of each disk surface. The linear density of each disk surface is then adjusted (step 44) in order to balance the measured metric across the disk surfaces similar to balancing the OTRCs as illustrated in FIG. 3. After adjusting the linear density of each disk surface, a determination is made (step 46) as to whether the disk drive will provide adequate performance. For example, the performance may be determined based on the balanced metrics, wherein if the balanced metrics is less than a minimum threshold, the combined target capacity of the disk surfaces is reduced (step 48) and the process repeated starting at step 42 until adequate performance is achieved.

After adjusting the linear densities of the disk surfaces to balance the measured metric (step 44), the radial density is optimized at the middle diameter for each disk surface based on the OTRCs. Referring again to FIG. 4A, all of the radial density profiles intersect near the middle diameter of a disk surface which represents a "DC" offset for each radial density profile. Accordingly, an optimal "DC" offset for the radial density is first selected at the middle diameter of each disk surface, and then one of the radial density profiles is selected for each disk surface. When selecting the "DC" offset radial density, a number of radial density settings are tested and a corresponding OTRC measured as described above with reference to FIG. 3. The radial density setting that maximizes the OTRC is then selected for each disk surface (step 52) and then the linear density of at least two disk surfaces is adjusted in order to balance the OTRCs (step 54). If the resulting performance of the disk drive is inadequate at step 56 (e.g., if the balanced OTRCs is below a minimum threshold), then the combined target capacity is reduced (step 48) and the process repeated starting at step 42.

Once a radial density setting has been selected for the middle diameter of each disk surface, a radial density profile is selected for each disk surface. For each radial density profile setting, an OTRC is measured (step 58) at multiple radial locations (multiple zones) across a disk surface, and then a radial density profile is selected (step 60) for the disk surface in response to the measured OTRCs (e.g., selecting the radial density profile that maximizes the average OTRC for the disk surface). Once a radial density profile has been selected for each disk surface, the linear density of at least two of the disk surfaces is adjusted in order to balance the OTRCs (step 62) as described above with reference to FIG. 3. If the resulting performance of the disk drive is inadequate at step 64 (e.g., if the balanced OTRCs is below a minimum threshold), then the combined target capacity is reduced (step 48) and the process repeated starting at step 42.

Figure 6:
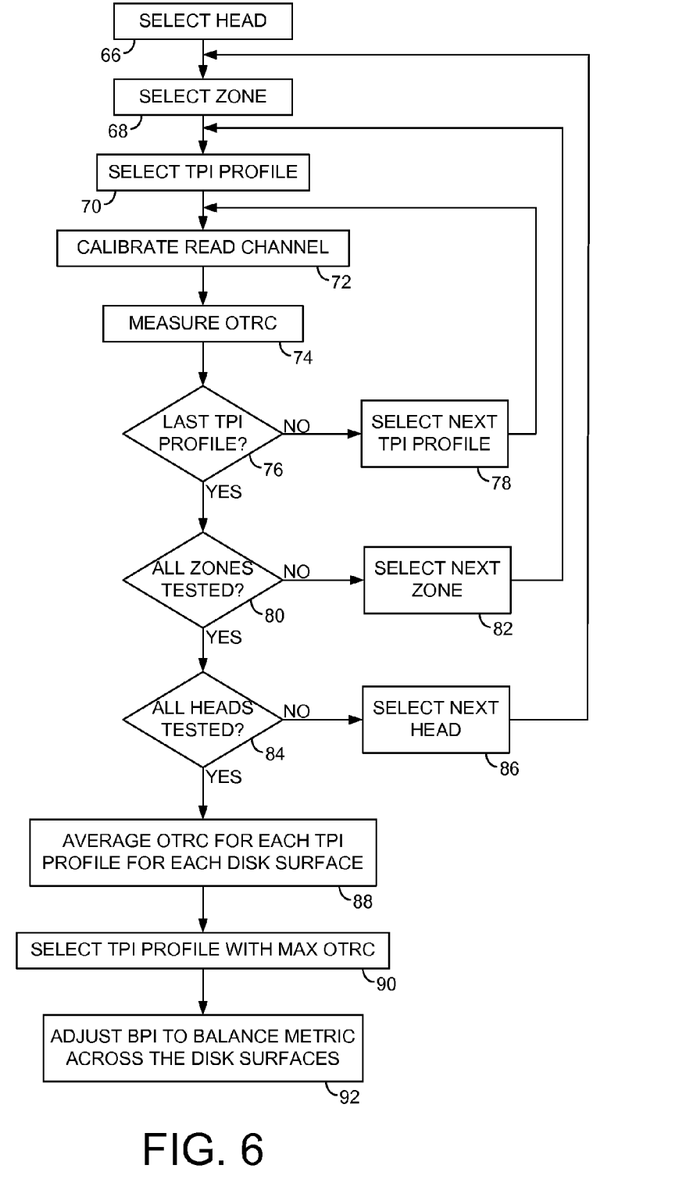
FIG. 6 is a flow diagram according to an embodiment of the present invention wherein an OTRC is measured at each zone of a radial density profile, and then the resulting OTRCs averaged.

FIG. 6 is a flow diagram according to an embodiment of the present invention for selecting a radial density profile for each disk surface. One of the heads is selected (step 66) and one of the zones is selected for the corresponding disk surface (step 68). A first radial density profile is selected for testing (step 70) and read channel parameters are calibrated for the selected radial density at the selected zone (step 72). The OTRC is then measured for the zone and the selected radial density profile (step 74). The process is then repeated for the next radial density profile (step 78) until an OTRC measurement has been generated for each radial density profile (step 76). The process is then repeated for the next zone (step 82) until all of the zones of the disk surface have been tested and corresponding OTRC measurements generated (step 80). The process is then repeated for the next head (step 86) until all of the disk surfaces have been tested and corresponding OTRC measurements generated (step 84). The OTRC measurements generated for each disk surface are averaged to generate an average OTRC measurement for each radial density profile (step 88), and then the radial density profile that maximizes the average OTRC measurement is selected for each disk surface (step 90). After selecting the radial density profile for each disk surface, the linear density of at least two of the disk surfaces is adjusted in order to balance the OTRCs (step 92) as described above with reference to FIG. 3.

The above described flow diagrams may be modified in any suitable manner in order to select the radial density of each disk surface based on OTRC. For example, in one embodiment, the minimum OTRC measurement for each radial density profile may be selected at step 88 of FIG. 6 rather than an average OTRC measurement. The radial density profile may then be selected corresponding to the maximum of the minimum OTRC measurements. In another embodiment, only a subset of the radial density profiles may be tested and a corresponding OTRC measurement generated. A suitable curve fitting algorithm may then be used to extrapolate the OTRC measurements and select a corresponding radial density profile that maximizes the OTRC. If an extrapolated radial density profile is selected that was not tested, then a final OTRC measurement may be taken for the selected radial density profile prior to balancing the OTRCs by adjusting the linear density of at least two of the disk surfaces.

In yet another embodiment, each radial density profile may be divided into a number of segments across the radius of the disk surface. The final radial density profile may then be selected for a disk surface by combining the segments from different radial density profiles. For example, the radial density profile segments that maximize the OTRC measurement across the disk surface may be selected and combined to generate the final radial density profile. An example of this embodiment is understood with reference to FIG. 4A wherein each radial density profile may comprise an inner diameter segment and an outer diameter segment. A final radial density profile may be generated, for example, by combining the inner diameter segment of radial density profile A and the outer diameter segment of radial density profile E.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a plurality of disk surfaces;
a head actuated over each disk surface; and
control circuitry operable to:
  measure an off-track read capability (OTRC) for each disk surface;
  select a radial density of data tracks for each disk surface in response to the OTRCs; and
  after selecting the radial density of data tracks for each disk surface, adjust a linear density of at least two disk surfaces to balance the OTRCs across the disk surfaces.

2. The disk drive as recited in claim 1, wherein the control circuitry is operable to select the radial density for each disk surface that maximizes the OTRC.

3. The disk drive as recited in claim 1, wherein the control circuitry is operable to balance the OTRCs by:
increasing the linear density of a first disk surface to decrease the OTRC of the first disk surface; and
decreasing the linear density of a second disk surface to increase the OTRC of the second disk surface.

4. The disk drive as recited in claim 1, wherein the control circuitry is operable to:
measure a middle diameter (MD) OTRC for each disk surface;
select a MD radial density near a middle diameter of each disk surface based on the MD OTRC;
adjust a linear density of at least two disk surfaces to balance the MD OTRCs across the disk surfaces;
measure a profile OTRC for a plurality of profile radial densities spanning each disk surface;
select one of the profile radial densities for each disk surface in response to the profile OTRCs; and
adjust the linear density of at least two disk surfaces to balance the profile OTRCs across the disk surfaces.

5. The disk drive as recited in claim 4, wherein the control circuitry is operable to select the profile radial density for a first disk surface by:
measuring a first OTRC at an inner diameter of the first disk surface for a first profile radial density;
measuring a second OTRC at an outer diameter of the first disk surface for the first profile radial density; and
averaging the first and second OTRC to generate a first average OTRC.

6. The disk drive as recited in claim 5, wherein the control circuitry is operable to select the profile radial density for the first disk surface by:
measuring a third OTRC at an inner diameter of the first disk surface for a second profile radial density;
measuring a fourth OTRC at an outer diameter of the first disk surface for the second profile radial density;
averaging the third and fourth OTRC to generate a second average OTRC; and selecting between the first and second profile radial density in response to the first and second average OTRC.

7. The disk drive as recited in claim 1, wherein the control circuitry is further operable to reduce a combined target capacity of the disk surfaces when the balanced OTRCs falls below a threshold.

8. A method of operating a disk drive, the disk drive comprising a plurality of disk surfaces, and a head actuated over each disk surface, the method comprising:
   measuring an off-track read capability (OTRC) for each disk surface;
   selecting a radial density of data tracks for each disk surface in response to the OTRCs; and
   after selecting the radial density of data tracks for each disk surface, adjusting a linear density of at least two disk surfaces to balance the OTRCs across the disk surfaces.

9. The method as recited in claim 8, further comprising selecting the radial density for each disk surface that maximizes the OTRC.

10. The method as recited in claim 8, further comprising balancing the OTRCs by:
    increasing the linear density of a first disk surface to decrease the OTRC of the first disk surface; and
    decreasing the linear density of a second disk surface to increase the OTRC of the second disk surface.

11. The method as recited in claim 8, further comprising:
    measuring a middle diameter (MD) OTRC for each disk surface;
    selecting a MD radial density near a middle diameter of each disk surface based on the MD OTRC;
    adjusting a linear density of at least two disk surfaces to balance the MD OTRCs across the disk surfaces;
    measuring a profile OTRC for a plurality of profile radial densities spanning each disk surface;
    selecting one of the profile radial densities for each disk surface in response to the profile OTRCs; and
    adjusting the linear density of at least two disk surfaces to balance the profile OTRCs across the disk surfaces.

12. The method as recited in claim 11, further comprising selecting the profile radial density for a first disk surface by:
    measuring a first OTRC at an inner diameter of the first disk surface for a first profile radial density;
    measuring a second OTRC at an outer diameter of the first disk surface for the first profile radial density; and
    averaging the first and second OTRC to generate a first average OTRC.

13. The method as recited in claim 12, further comprising selecting the profile radial density for the first disk surface by:
    measuring a third OTRC at an inner diameter of the first disk surface for a second profile radial density;
    measuring a fourth OTRC at an outer diameter of the first disk surface for the second profile radial density;
    averaging the third and fourth OTRC to generate a second average OTRC; and
    selecting between the first and second profile radial density in response to the first and second average OTRC.

14. The method as recited in claim 8, further comprising reducing a combined target capacity of the disk surfaces when the balanced OTRCs falls below a threshold.

* * * * *

UNITED STATES PATENT AND TRADEMARK OFFICE
CERTIFICATE OF CORRECTION

| | | |
|---|---|---|
| PATENT NO. | : 8,630,052 B1 | Page 1 of 1 |
| APPLICATION NO. | : 13/196297 | |
| DATED | : January 14, 2014 | |
| INVENTOR(S) | : Kameron Kam-Wai Jung et al. | |

It is certified that error appears in the above-identified patent and that said Letters Patent is hereby corrected as shown below:

In the Specification

Col. 3, line 32, "decreasing" should be changed to --increasing--.

Col. 3, line 33, "increasing" should be changed to --decreasing--.

Signed and Sealed this
First Day of April, 2014

Michelle K. Lee
*Deputy Director of the United States Patent and Trademark Office*